May 14, 1963  M. F. WALKER  3,089,573
ELECTROMAGNETICALLY OPERATED CLUTCH-BRAKE
Filed Aug. 10, 1960
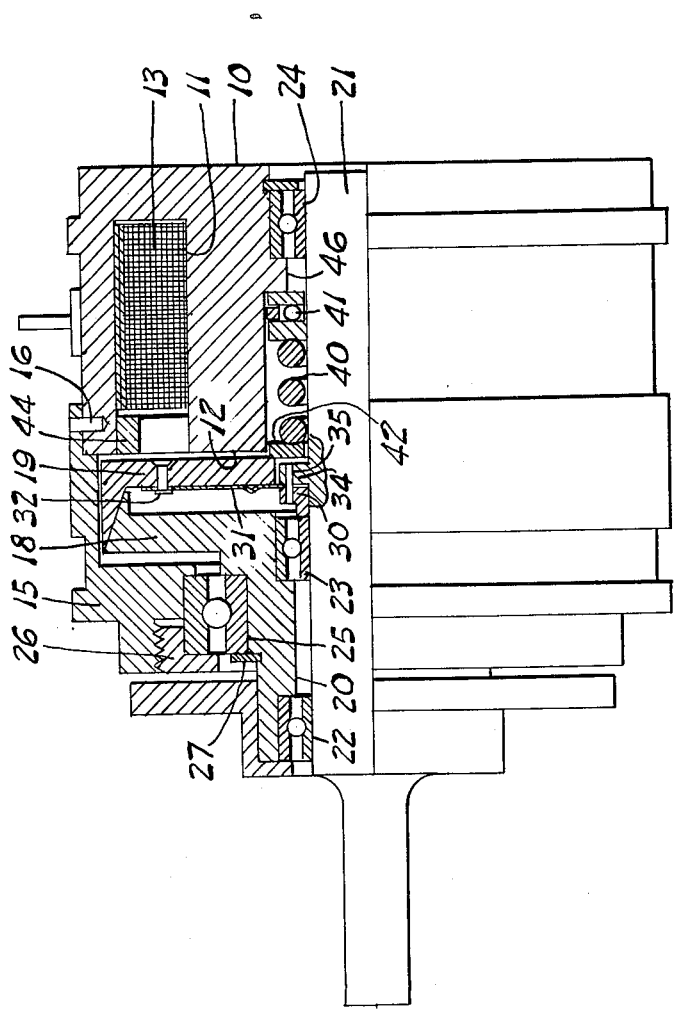
INVENTOR.
MELVIN F. WALKER
BY
Bean Brooks Buckley + Bean
ATTORNEYS United States Patent Office 3,089,573
Patented May 14, 1963

3,089,573
ELECTROMAGNETICALLY OPERATED
CLUTCH-BRAKE
Melvin F. Walker, Tonawanda, N.Y., assignor to General-Electro Mechanical Corporation, Buffalo, N.Y.
Filed Aug. 10, 1960, Ser. No. 48,589
4 Claims. (Cl. 192—18)

This invention relates to electromagnetically controlled and operated clutch-brake apparatus and particularly to such apparatus wherein an electromagnetically controlled armature operates successively and alternatively as a clutch component and as a brake element.

Numerous prior art clutch-brake assemblies have been used wherein a rotatable and axially movable component is shiftable between a position in which it engages a rotary drive component and a position in which it engages a braking component. In such arrangements the rotatable and axially movable component usually comprises the driven member of the combination and may have connection with an output shaft or other output member in various ways.

The present invention relates to clutch-brake mechanisms of the foregoing type and is characterized by the fact that the general arrangement of the parts is more efficient and effective both from a manufacturing and from an operating standpoint. A radially extending flexible plate member is fixed more or less centrally to an output shaft element and marginally to the aforesaid shiftable clutch-brake component so that the latter is free to move axially with respect to the output shaft but has direct rotary driving connection therewith by means which involve no play or back-lash such as is usual in spline driving connections and other drive connections for this general purpose.

The three general components which are mounted for free relative rotation with respect to each other, namely the input component, the output component, including the axially shiftable clutch-brake member and the casing or housing which includes the braking surface, are all formed and arranged to provide a compact and efficient clutch-brake assembly and are adapted for convenient, accurate and efficient rotational support relative to each other. A superior degree of efficiency and effectiveness is achieved from both a mechanical and an electromagnetic standpoint.

Various objects and advantages inherent in and flowing from the arrangement and construction of the clutch-brake unit of the present invention will become apparent to those skilled in the present art from a consideration of the following specification, taken in conjunction with the accompanying drawing. However, it is to be understood that the embodiment thus set forth is by way of example only and various modifications may be made therein without departing from the principles of the present invention, the scope of which is limited only as defined in the appended claims.

The single FIGURE of the drawing is a central longitudinal cross-sectional view through one form of the clutch-brake unit of the present invention.

The numeral 10 designates a cylindrical casing member of magnetic material having an annular chamber 11 in a radial face 12 thereof in which chamber is disposed an electromagnetic winding 13. As thus constituted, the casing member 10 forms an electromagnet wherein the annular portions lying outwardly and inwardly of the chamber 11 forms the opposite poles.

A further annular somewhat cup-shaped casing portion 15 is of non-magnetic material such as stainless steel and in the present instance telescopes over the end of casing member 10 at the radial face 12 thereof and is pinned to casing member 10 as at 16. Casing portion 15 forms a housing for a driving male clutch member 18 and a driven female clutch member 19 having complementary conical clutching faces. The driving clutch member 18 comprises part of a driving rotor 20 and the latter is rotatably mounted with respect to an output shaft 21 by means of anti-friction bearings 22 and 23.

The opposite end of shaft 21 is journaled in casing member 10 by means of an anti-friction bearing 24. Driving rotor 20 has anti-friction bearing in casing portion 15 as at 25, bearing 25 being retained in casing member 15 by a threaded retaining ring 26. The inner race of bearing 25 is retained axially with respect to rotor 20 by a snap ring 27 and thus the rotor 20 and the driving clutch member 18 are effectively held against relative axial movement with respect to casing members 10 and 15.

The entire assembly comprising the casing members 10 and 15 and the rotor 20 is held against movement to the right relative to shaft 21 as viewed in the drawing by engagement of the inner race of bearing 23 against a collar 30, the primary purpose of which will presently appear.

An annular diaphragm 31 is riveted adjacent to its outer periphery to driven clutch member 19 as at 32 and is fixed centrally with respect to shaft 21 by engagement between a flange 34 on shaft 21 and the aforesaid collar 30. A series of circumferential pins 35 passes through the collar 30, diaphragm 31 and flange 34.

This diaphragm connection between shaft 21 and driven clutch member 19 permits relative axial movement of the clutch member 19 by deflection of diaphragm 31 in a direction normal to its plane of extent, that is, in an axial direction. However, the diaphragm is not subject to any material deflection in the plane of its extent under stresses of the magnitude contemplated herein and therefore, while permitting relative axial movement, the diaphragm provides a simple and economical zero back-lash driving connection between driven clutch member 19 and shaft 21, such connection being not only simpler but more effective and much more accurate than conventional spline connections or other expedients employed in the prior art for this purpose.

Driven clutch member 19 is normally urged to clutching position by compression coil spring 40 which engages between a thrust bearing assembly 41 which seats within casing member 10 and a washer 42 which engages against an inner peripheral portion of clutch member 19. A ring or collar 44 of magnetic material is pressed into the outer end of annular chamber 11 after winding 13 has been inserted therein to retain the winding and to provide an extended pole face surface at radial face 12.

When electromagnet 13 is energized the driven clutch member 19 is attracted to the radial face 12 of casing member 10, including the coplanar face of ring or collar 44, and engages the same in effective and efficient braking contact. The reaction force of coil spring 40 which urges anti-friction thrust bearing 41 to the right against an internal annular flange 46 of casing 10 effectively prevents movement of the casing and rotor assembly to the left with respect to shaft 21.

I claim:
1. In an electromagnetically operated clutch-brake unit, a cylindrical casing member of magnetic material having a radial end face comprising a brake surface, an annular recess in said face and an electromagnetic winding in said recess, a cup-shaped casing member of non-magnetic material coaxial with said cylindrical casing member and having its open end connected thereto adjacent to said radial end face whereby the interior of said cup-shaped member and said radial end face form a generally cylindrical chamber, a shaft extending axially through said casing members and having bearing in said cylindrical casing member, a rotor member having bearing on said shaft, a bearing between said rotor member and said cup-shaped casing member, said rotor member having a radially enlarged portion in said chamber comprising a driving clutch member, an annular clutch-brake member in said chamber between the clutch member and said radial face and having a circumferential portion for frictional driving engagement with said driving clutch member, said casing member end face and the adjacent face of said clutch-brake member having braking engagement when said electromagnetic winding is energized, a flexible relatively flat annular diaphragm having its outer marginal portion fixed to said clutch-brake member and its inner marginal portion fixed to said shaft whereby said clutch-brake member has limited axial movement relative to said shaft by flexure of said diaphragm but is fixed by said diaphragm against relative rotative movement relative to said shaft, and a compression coil spring acting between said casing and said clutch-brake member urging the latter to clutching position with respect to said driving clutch member.

2. In an electromagnetically operated clutch-brake unit, a cylindrical casing member of magnetic material having a radial end face comprising a brake surface, an annular recess in said face and an electromagnetic winding in said recess, a shaft extending axially through said casing member and journalled therein, a rotor member having bearing on said shaft, said rotor member having a radial enlargement including a conical portion comprising a driving clutch member, an annular clutch-brake member in said chamber between the clutch member and said radial face and having a complementary conical portion for frictional driving engagement with said driving clutch member, said casing member end face at both sides of said annular recess and the adjacent radial face of said clutch-brake member having braking engagement when said electromagnetic winding is energized, a flexible relatively flat annular diaphragm having its outer marginal portion fixed to said clutch-brake member and its inner marginal portion fixed to said shaft whereby said clutch-brake member has limited axial movement relative to said shaft by flexure of said diaphragm but is fixed by said diaphragm against relative rotative movement relative to said shaft, and a compression coil spring acting between said casing and said clutch-brake member urging the latter to clutching position with respect to said driving clutch member.

3. In an electromagnetically operated clutch-brake unit, a cylindrical casing member of magnetic material having a radial end face comprising a brake surface, an annular recess in said face and an electromagnetic winding in said recess, a shaft extending axially through said casing member and journalled therein, a rotor member having bearing on said shaft, said rotor member having a radially enlarged portion comprising a driving clutch member, an annular clutch-brake member between said driving clutch member and said radial face and having a circumferential portion for frictional driving engagement with said driving clutch member, said casing member end face and the adjacent face of said clutch-brake member having braking engagement when said electromagnetic winding is energized, a flexible relatively flat annular diaphragm having its outer marginal portion fixed to said clutch-brake member and its inner marginal portion fixed to said shaft whereby said clutch-brake member has limited axial movement relative to said shaft by flexure of said diaphragm but is fixed by said diaphragm against relative rotative movement relative to said shaft, and a compression coil spring acting between said casing and said clutch-brake member urging the latter to clutching position with respect to said driving clutch member.

4. In an electromagnetically operated clutch-brake unit, a cylindrical casing member of magnetic material having a radial end face comprising a brake surface, an annular recess in said face and an electromagnetic winding in said recess, a cup-shaped casing member of nonmagnetic material coaxial with said cylindrical casing member having its open end connected thereto adjacent to said radial end face whereby the interior of said cup-shaped member and said radial end face form an annular chamber, a shaft extending axially through said casing members and having anti-friction bearing in said cylindrical casing member at the end opposite to said radial face, a rotor member having anti-friction bearing on said shaft, an anti-friction bearing between said rotor member and said cup-shaped casing member, said rotor member having a radially enlarged portion in said chamber comprising a clutch member, a cooperating clutch member in said chamber between the first clutch member and said radial face and having a circumferential portion for frictional driving engagement with the first mentioned clutch member, a flexible relatively flat annular diaphragm having its outer marginal portion fixed to said second mentioned clutch member and its inner marginal portion fixed to said shaft whereby said second mentioned clutch element has limited axial movement relative to said shaft by flexure of said diaphragm but is fixed by said diaphragm against relative angular movement about the shaft axis, and a compression coil spring acting between said casing and said second mentioned clutch member urging the latter to clutching position with respect to the first mentioned clutch member, said second mentioned clutch member having a radial face thereof adapted for braking engagement with the radial end face of said casing member when said electromagnetic is energized.

References Cited in the file of this patent
UNITED STATES PATENTS

| | | |
|---|---|---|
| 2,481,028 | Lear | Sept. 6, 1949 |
| 2,727,605 | Rabinow | Dec. 20, 1955 |
| 2,803,323 | Newell | Aug. 20, 1957 |
| 2,840,205 | Linke | June 24, 1958 |
| 2,914,156 | Harting | Nov. 24, 1959 |
| 2,919,777 | Walter | Jan. 5, 1960 |
| 2,954,859 | Rabinow | Nov. 4, 1960 |
| 2,965,203 | White | Dec. 20, 1960 |
| 3,019,877 | Onyskin | Feb. 6, 1962 |